(12) United States Patent
Lee et al.

(10) Patent No.: US 11,645,955 B2
(45) Date of Patent: May 9, 2023

(54) TILING DISPLAY, DISPLAY PANEL ALIGNMENT DEVICE, AND MANUFACTURING METHOD FOR THE SAME

(71) Applicant: Samsung Display Co., LTD., Yongin-si (KR)

(72) Inventors: Seung-Kyu Lee, Cheonan-si (KR); Sang Seop Kum, Asan-si (KR); Beom Jun Kim, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/468,089

(22) Filed: Sep. 7, 2021

(65) Prior Publication Data
US 2022/0114924 A1    Apr. 14, 2022

(30) Foreign Application Priority Data
Oct. 13, 2020    (KR) .......................... 10-2020-0131921

(51) Int. Cl.
*G09F 9/302* (2006.01)
*G06F 3/14* (2006.01)

(52) U.S. Cl.
CPC .......... *G09F 9/3026* (2013.01); *G06F 3/1446* (2013.01)

(58) Field of Classification Search
CPC ............................ G09F 9/3026; G06F 3/1446
See application file for complete search history.

(56) References Cited

U.S. PATENT DOCUMENTS

| | | | |
|---|---|---|---|
| 2017/0198890 A1* | 7/2017 | Jurewicz | G06T 19/00 |
| 2022/0022330 A1* | 1/2022 | Dewaele | F16M 11/18 |
| 2022/0144085 A1* | 5/2022 | Lian | F16M 11/2092 |

FOREIGN PATENT DOCUMENTS

| | | | |
|---|---|---|---|
| KR | 2002-0075261 | 10/2002 | |
| KR | 10-2005-0078761 | 8/2005 | |
| KR | 10-1254602 | 4/2013 | |
| KR | 10-1267899 | 5/2013 | |
| KR | 10-2020-0073600 | 6/2020 | |
| WO | WO-2021203617 A1 * | 10/2021 | F16B 5/0225 |

* cited by examiner

*Primary Examiner* — Chanh D Nguyen
*Assistant Examiner* — Ngan T. Pham-Lu
(74) *Attorney, Agent, or Firm* — Kile Park Reed & Houtteman PLLC

(57) ABSTRACT

A display panel alignment device of a tiling display includes a frame including panel seating portions and a gap around the panel seating portions, and a panel movement controller disposed in each of the panel seating portions. A display panel is disposed in each of the panel seating portions. The panel movement controller controls a movement of the display panel in a front direction, a rear direction, a left direction, and a right direction, and controls rotation of the display panel.

15 Claims, 5 Drawing Sheets

TILING DISPLAY, DISPLAY PANEL ALIGNMENT DEVICE, AND MANUFACTURING METHOD FOR THE SAME

CROSS-REFERENCE TO RELATED APPLICATION(S)

This application claims priority to and benefits of Korean Patent Application No. 10-2020-0131921 under 35 U.S.C. § 119, filed on Oct. 13, 2020 in the Korean Intellectual Property Office, the entire contents of which are incorporated herein by reference.

BACKGROUND

1. Field

This disclosure relates to a tiling display, a display panel alignment device for manufacturing a tiling display, and a method of manufacturing a tiling display, and more particularly, to a device for aligning display panels of a tiling display, and a method of aligning the display panels.

2. Description of the Related Art

In the display technologies, there have been developments in the methods of attaching multiple display panels to manufacture larger sizes and/or various shapes of displays. A flat panel display such as an organic light emitting display (OLED) or a liquid crystal display can be made using such methods.

Such a tiling display may have various shapes and sizes by combining or assembling display panels in various manners. The tiling display has no size limit and is also advantageous in terms of manufacturing cost compared to making a single panel display having the same size of a tiling display.

However, since a tiling display is manufactured by connecting multiple display panels, boundary portions of the display panels may be visually recognizable. Thus, when assembling the display panels, it is necessary to precisely align and assemble them such that there are no gaps between the panels. However, since the display panels are large in size and heavy in weight, it is difficult to precisely control movement of each of the display panels and align them at accurate and desired positions.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The embodiments provide a device and method capable of aligning display panels when a tiling display is manufactured.

In an embodiment, a display panel alignment device of a tiling display may include a frame including panel seating portions and a gap around the panel seating portions, and a panel movement controller disposed in each of the panel seating portions of the frame. A display panel may be disposed in each of the panel seating portions. The panel movement controller may control a movement of the display panel in a front direction, a rear direction, a left direction, and a right direction, and may control rotation of the display panel.

The frame may include an edge wall surrounding an outer periphery of the gap of the frame.

The panel movement controller may include a rotator that may control the rotation of the display panel, an x-axis mover that may control movement of the rotator in an x-axis direction and may be disposed below the rotator, and a y-axis mover that may control movement of the rotator in a y-axis direction and may be disposed below the x-axis mover.

The rotator may be horizontally rotatable on the x-axis mover.

The x-axis mover may include an x-axis movement stage in which a rotation shaft of the rotator may be disposed, an x-axis movement mechanism that may move the x-axis movement stage in the left direction and the right direction, and a connection member that may be connected to the y-axis mover. The x-axis movement mechanism may be fitted into the connection member.

The y-axis mover may include a y-axis movement stage to which the connection member of the x-axis mover is connected, a tooth plane disposed on a lower surface of the y-axis movement stage, a y-axis movement mechanism that may move the y-axis movement stage in the y-axis direction, the y-axis movement mechanism having a cylindrical shape, and a cylindrical tooth rod disposed at a central portion of the y-axis movement mechanism.

The tooth plane and the cylindrical tooth rod may be engaged with each other, and the y-axis movement stage may move in the front direction and the rear direction by rotating the cylindrical tooth rod to push the tooth plane.

The panel movement controller may include a cover frame accommodating the x-axis mover and the y-axis mover, and the y-axis movement mechanism may be disposed in the cover frame and rotatable around an axis of the cylindrical tooth rod.

An alignment mark may be disposed at a boundary between the panel seating portions of the frame.

In an embodiment, a tiling display device may include a frame including panel seating portions, panel movement controllers disposed in the panel seating portions, respectively, of the frame, display panels disposed on the panel movement controllers, and a fixing member surrounding and fixing the display panels. The panel movement controllers may control movement of the display panels in a front direction, a rear direction, a left direction, and a right direction and may control rotation of the display panels.

The frame may include an edge wall surrounding the fixing member.

Each of the panel movement controllers of the tiling display device may include a rotator that may control the rotation of the display panel, an x-axis mover that may control movement of the rotator in an x-axis direction and may be disposed below the rotator, and a y-axis mover that may control movement of the rotator in a y-axis direction and may be disposed below the x-axis mover.

The rotator may be horizontally rotatable on the x-axis mover.

The x-axis mover may include an x-axis movement stage in which a rotation shaft of the rotator may be disposed, an x-axis movement mechanism that may move the x-axis movement stage in the left direction and the right direction, and a connection member that may be connected to the y-axis mover. The x-axis movement mechanism may be fitted into the connection member.

The y-axis mover may include a y-axis movement stage to which the connection member of the x-axis mover is connected, a tooth plane disposed on a lower surface of the y-axis movement stage, a y-axis movement mechanism that may move the y-axis movement stage in the y-axis direction, the y-axis movement mechanism having a cylindrical shape, and a cylindrical tooth rod disposed at a central portion of the y-axis movement mechanism.

The panel movement controller may include a cover frame accommodating the x-axis mover and the y-axis mover, and the y-axis movement mechanism may be disposed in the cover frame and rotatable around an axis of the cylindrical tooth rod.

An alignment mark may be disposed at a boundary between the panel seating portions of the frame.

In an embodiment, a manufacturing method of a tiling display may use a display panel alignment device. The display panel alignment device may include a frame including panel seating portions and a gap around the panel seating portions, and a panel movement controller disposed in each of the panel seating portions of the frame. The panel movement controller may control a movement of the display panel in a front direction, a rear direction, a left direction, and a right direction and may control rotation of the display panel. The manufacturing method may include mounting a display panel on the panel movement controller disposed in each of the panel seating portions of the frame, aligning the display panel by adjusting the panel movement controller, and fixing a position of the aligned display panel.

The manufacturing method may further include, after the fixing of the position of the aligned display panel, mounting a separate frame on the aligned display panel, and transferring the aligned display panel onto the separate frame by inverting the separate frame and the display panel alignment device together.

The fixing of the position of the aligned display panel may include applying an adhesive resin or a double-sided tape to an outer periphery of the aligned display panel.

According to the embodiments, since each display panel may be precisely moved forward, backward, left, and right, and rotated, the precision of panel alignment may be improved.

It is possible to easily control the precise movement of each of the display panels to the front, rear, left, and right and precise rotation, thereby reducing manufacturing time and cost of a tiling display.

DETAILED DESCRIPTION OF THE EMBODIMENTS

Figure 1:
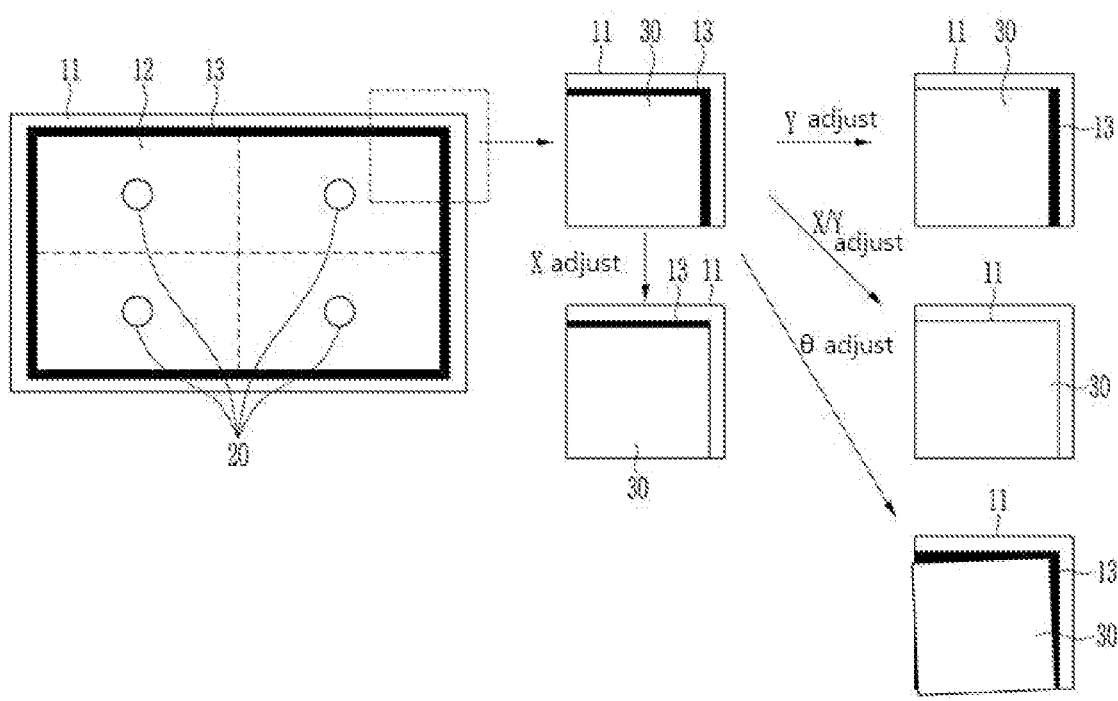
FIG. 1 illustrates a schematic view showing a display panel alignment device of a tiling display and a display panel aligning method according to an embodiment.

The embodiments will be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. As those skilled in the art would realize, the described embodiments may be modified in various different ways, all without departing from the spirit or scope of the embodiments.

To clearly describe the embodiments parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the embodiments are not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be understood that when an element (or a region, a layer, a portion, or the like) is referred to as "being on", "connected to" or "coupled to" another element in the specification, it can be directly disposed on, connected, or coupled to another element mentioned above, or intervening elements may be disposed therebetween.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

It will be understood that when an element "surrounds" or "accommodates" another element, or another element is disposed "in" an element in the specification, this may include that the element can substantially overlap or substantially contain the other element as well as strictly enclose or encase the other element, and include other dispositions of elements as would be appreciated and understood by those of ordinary skill in the art.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a schematic view showing a display panel alignment device of a tiling display and a display panel aligning method according to an embodiment.

The display panel alignment device of the tiling display according to an embodiment may include a frame 11, panel seating portions 12 positioned in the frame 11, a gap 13, which may be free space positioned between the frame 11 and the panel seating portions 12, and panel movement controllers 20 installed in the center of each of the panel seating portions 12.

The frame 11 may be a portion of an outer frame of the tiling display, and may protrude upward from the ground to form a wall surrounding the panel seating portions 12 and the gap 13. The panel seating portion 12 refers to an area in which a display panel is disposed. In the embodiments, although it is illustrated that four panel seating portions 12 are arranged 2×2, the number of panel seating portions 12 may be expanded or reduced to a M×N size (where M and N are natural numbers). The gap 13 refers to extra space that may be provided to adjust the position and posture of a panel disposed on each of the panel seating portions 12. The panel movement controller 20 is a device that may be capable of adjusting the position and posture of a panel. The detailed structure of the panel movement controller 20 will be described below with reference to FIG. 2 to FIG. 4.

The display panel may be disposed on the panel movement controller 20, and the position and posture of the display panel may be controlled by adjusting the panel movement controller 20. As illustrated in FIG. 1, the position of the display panel may be finely adjusted in x-axis and y-axis directions by independently adjusting the position in the x-axis direction and in the y-axis direction, and correcting a twisted posture through a rotational movement (θ direction movement).

Figure 2:
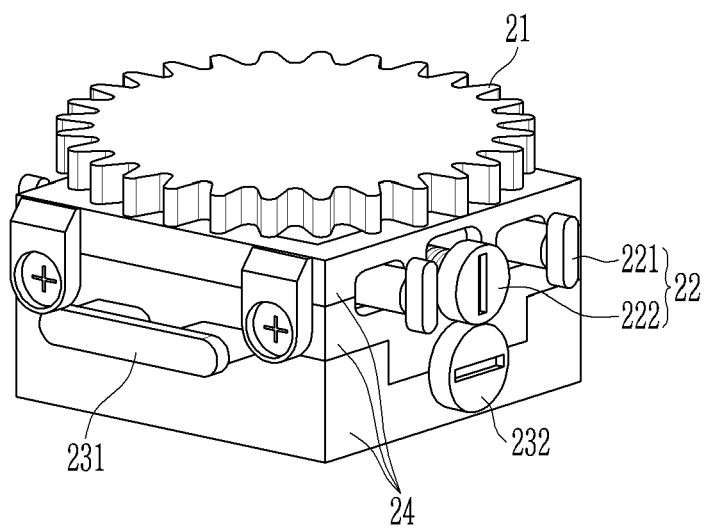
FIG. 2 illustrates a schematic perspective view of a panel movement controller applied to a display panel alignment device according to an embodiment.
Figure 3:
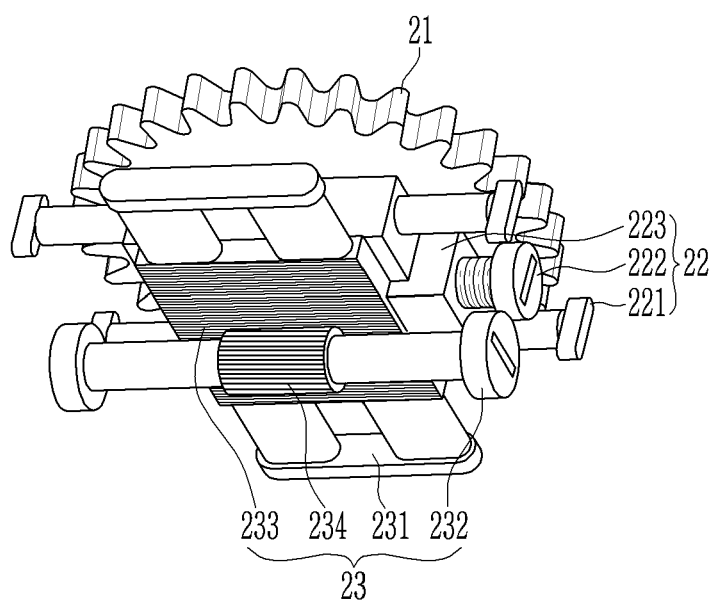
FIG. 3 illustrates a schematic perspective view of the panel movement controller of FIG. 2 with the cover frame removed and viewed from the bottom.
Figure 4:
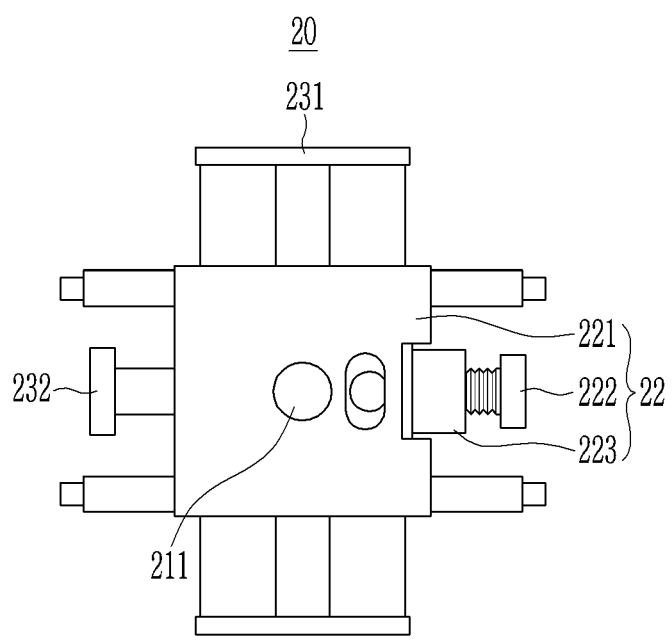
FIG. 4 illustrates a schematic perspective view of the panel movement controller of FIG. 2 with a cover frame and a rotator removed as viewed from a top thereof.

FIG. 2 illustrates a schematic perspective view of a panel movement controller applied to a display panel alignment device according to an embodiment. FIG. 3 illustrates a schematic perspective view of the panel movement controller of FIG. 2 with a cover frame removed viewed from the bottom. FIG. 4 illustrates a schematic perspective view of the panel movement controller 20 of FIG. 2 with the cover frame and the rotator 21 removed as viewed from the top.

The panel movement controller 20 includes a rotator 21, an x-axis mover 22 disposed under the rotator 21, a y-axis mover 23 disposed under the x-axis mover 22, and a cover frame 24. Herein, an x-axis and a y-axis may be arbitrarily set depending on a shape of the display panel alignment device.

The rotator 21 is the part on which the display panel may be mounted and by which the display panel may be rotated. The rotator 21 may have a rotation shaft 211 formed (or disposed) at a center to enable rotation, and the rotation shaft 211 is installed to be rotatable on the x-axis mover 22. In an embodiment, the rotator 21 is illustrated in a shape of a cogwheel, but may have other shapes such as a disk. The rotational movement (θ direction movement) of the display panel may be performed by applying force to the display panel itself.

The x-axis mover 22 may be disposed under the rotator 21 to move the rotator 21 in the x-axis direction. The x-axis mover 22 includes an x-axis moving stage 221 on which the rotation shaft 211 of the rotator 21 is installed, an x-axis movement mechanism 222 that moves the x-axis movement stage 221 to the left and to the right, and a connection member 223. The x-axis movement mechanism 222 may be fitted in the connection member 223. The connection member 223 may connect the x-axis mover 22 to the y-axis mover 23 such that the x-axis movement mechanism 222 may be movable in the x-axis direction. The x-axis movement mechanism 222 may have a male screw shape, and may be inserted into the connection member 223 serving as a female screw. The x-axis movement stage 221 may be finely moved in the x-axis direction by rotating the x-axis movement mechanism 222 by inserting a tool such as a screwdriver into the driver groove of the male screw head portion of the x-axis movement mechanism 222. The x-axis mover may control movement of the display panel in the left and right directions.

The y-axis mover 23 may be disposed under the x-axis mover 22 to move the x-axis mover 22 and the rotator 21 together in the y-axis direction. The y-axis mover 23 may include a y-axis movement stage 231 to which the connection member 223 may be connected and fixed, a tooth plane 233 formed (or disposed) on a lower surface of the y-axis movement stage 231, a y-axis movement mechanism 232 that moves the y-axis movement stage 231 in the y-axis direction, and a cylindrical tooth rod 234 formed (or disposed) in the center of the cylindrical y-axis movement mechanism 232. The cylindrical tooth rod 234 may be engaged with the tooth plane 233, and the y-axis movement stage 231 may be moved by rotating the cylindrical tooth rod 234 to push the tooth plane 233 in the y-axis direction. Accordingly, the y-axis movement stage 231 may be finely moved in the y-axis direction when a tool such as a screwdriver is inserted into the driver grooves formed at head portions of opposite ends of the y-axis movement mechanism 232 and rotated. The y-axis movement mechanism 232 may be installed in the cover frame 24 and may be rotatable around the axis of the cylindrical tooth rod 234. The y-axis mover may control movement of the display panel in the front and back directions. The cover frame 24 may accommodate the y-axis mover 23 and the x-axis mover 22.

As described above, in an embodiment, the display panel may be disposed on the panel movement controller 20 installed in each of the panel seating portions 12 to be adjusted in the x-axis, the y-axis, and the θ directions, thereby minimizing gaps between the panels. The panel movement controller 20 may control movement of a display panel in a front direction, a back direction, a left direction, and a right direction, and may also control a rotation of the display panel. Alignment marks (dotted lines in FIG. 1) indicating the positions of the respective panels may be formed (or disposed) at boundaries of the panel seating portions 12 to facilitate panel alignment.

Panels arranged without gaps may be fixed by using an adhesive resin or a double-sided tape. The adhesive resin or the double-sided tape may be inserted into the gap 13. The display panels may be adhesively fixed to the display panel alignment device to be used as a tiling display. The display panel alignment device may be used as a background frame of the display device. The display panels may be adhered to the rotator 21 of the display panel alignment device. In other embodiments, the aligned display panels may be separated from the display panel alignment device, and may be transferred to a separate frame to make up the display device. This will be described below.

Figure 5:
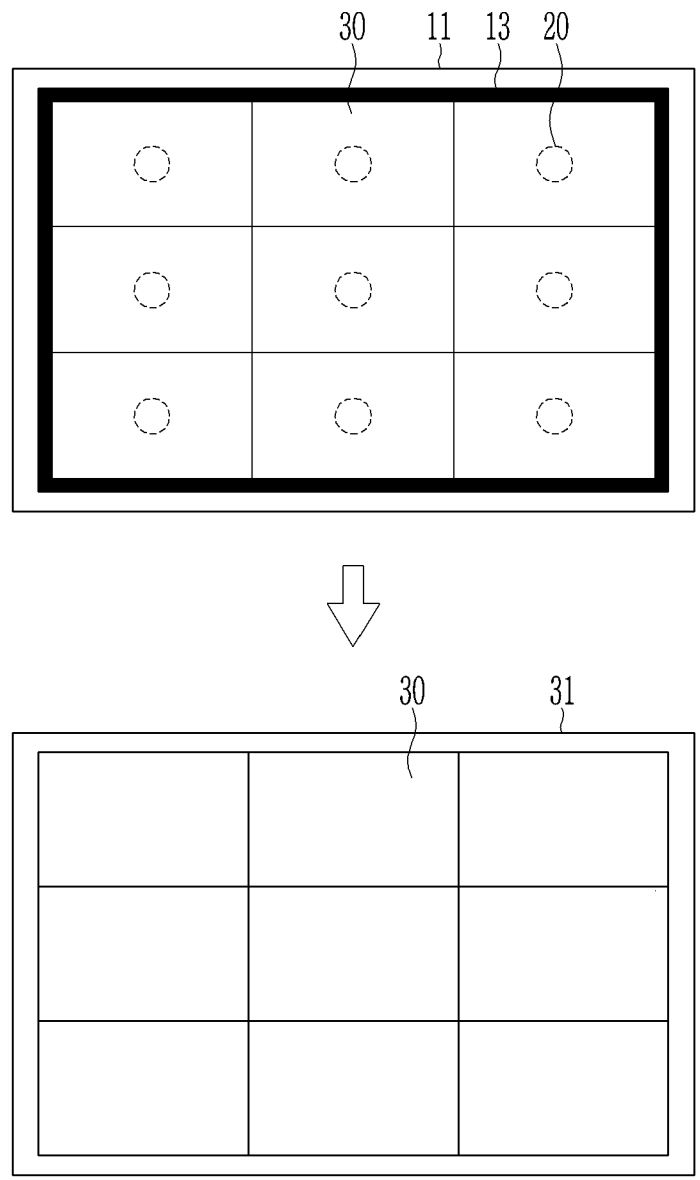
FIG. 5 illustrates a schematic view showing a manufacturing method of a tiling display according to an embodiment.

FIG. 5 illustrates a schematic view showing a manufacturing method of a tiling display according to an embodiment.

As described above, in an embodiment, display panels 30 may be disposed on the panel movement controllers 20 installed for each of the panel seating portions 12, to be aligned without gaps between the display panels 30 by adjusting positions of the display panels in x-axis, y-axis, and θ directions. The positions of the display panels 30 may be fixed by applying an adhesive resin or a double-sided tape to the peripheries of the display panels.

A separate frame 31 may be positioned on the aligned display panels 30, and the frame 31 and the display panel alignment device are turned over together so that the display panels 30 are transferred onto the frame 31.

Thereafter, a tiling display may be completed through a subsequent process such as fixing the display panels 30 to the frame 31.

In case that the tiling display is manufactured as described above, various errors, such as attachment error and scribe error, may be physically corrected while assembling the display panel, thereby additionally providing a process margin.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display panel alignment device of a tiling display, the device comprising:
   a frame including panel seating portions and a gap around the panel seating portions; and
   a panel movement controller disposed in each of the panel seating portions of the frame, wherein
   a display panel is disposed in each of the panel seating portions, and
   the panel movement controller controls a movement of the display panel in a front direction, a rear direction, a left direction, and a right direction, and controls rotation of the display panel,
   wherein the panel movement controller includes:
   a rotator that controls the rotation of the display panel,
   an x-axis mover that controls movement of the rotator in an x-axis direction and is disposed below the rotator; and
   a y-axis mover that controls movement of the rotator in a y-axis direction and is disposed below the x-axis mover,
   wherein the x-axis mover includes a connection member connected to the y-axis mover, wherein the y-axis mover includes:
   a y-axis movement stage to which the connection member of the x-axis mover is connected;
   a tooth plane disposed on a lower surface of the y-axis movement stage;
   a y-axis movement mechanism that moves the y-axis movement stage in the y-axis direction, the y-axis movement mechanism having a cylindrical shape; and
   a cylindrical tooth rod disposed at a central portion of the y-axis movement mechanism.

2. The display panel alignment device of claim 1, wherein the frame includes an edge wall surrounding an outer periphery of the gap of the frame.

3. The display panel alignment device of claim 1, wherein the rotator is horizontally rotatable on the x-axis mover.

4. The display panel alignment device of claim 3, wherein the x-axis mover includes:
   an x-axis movement stage in which a rotation shaft of the rotator is disposed; and
   an x-axis movement mechanism that moves the x-axis movement stage in the left direction and the right direction,
   wherein the x-axis movement mechanism is fitted in the connection member.

5. The display panel alignment device of claim 1, wherein the tooth plane and the cylindrical tooth rod are engaged with each other, and
   the y-axis movement stage moves in the front direction and the rear direction by rotating the cylindrical tooth rod to push the tooth plane.

6. The display panel alignment device of claim 5, wherein the panel movement controller includes a cover frame accommodating the x-axis mover and the y-axis mover, and
   the y-axis movement mechanism is disposed in the cover frame and rotatable around an axis of the cylindrical tooth rod.

7. The display panel alignment device of claim 1, further comprising:
   an alignment mark formed at a boundary between the panel seating portions of the frame.

8. A tiling display device comprising:
   a frame including panel seating portions;
   panel movement controllers disposed in the panel seating portions, respectively, of the frame;
   display panels disposed on the panel movement controllers; and
   a fixing member surrounding and fixing the display panels,
   wherein the panel movement controllers control movement of the display panels in a front direction, a rear direction, a left direction, and a right direction, and control rotation of the display panels,
   wherein each of the panel movement controllers includes:
   a rotator that controls the rotation of the display panel;

an x-axis mover that controls movement of the rotator in an x-axis direction and is disposed below the rotator; and a y-axis mover that controls movement of the rotator in a y-axis direction and is disposed below the x-axis mover, wherein the x-axis move includes a connection member connected to the y-axis mover, wherein the y-axis mover includes:

a y-axis movement stage to which connection member of the x-axis mover is connected;

a tooth plane disposed on a lower surfaceof the y-axis movement stage;

a y-axis movement mechanism that moves the y-axis movement stage in the y-axis direction, the y-axis movement mechanism having a cylindrical shape; and a cylindrical tooth rod disposed at a central portion of the y-axis movement mechanism.

9. The tiling display device of claim 8, wherein the frame includes an edge wall surrounding the fixing member.

10. The tiling display device of claim 8, wherein the rotator is horizontally rotatable on the x-axis mover.

11. The tiling display device of claim 10, wherein the x-axis mover includes:

an x-axis movement stage in which a rotation shaft of the rotator is disposed; and an x-axis movement mechanism that moves the x-axis movement stage in the left direction and the right direction, wherein the x-axis movement mechanism is fitted in the connection member.

12. The tiling display device of claim 8, wherein the panel movement controller includes a cover frame accommodating the x-axis mover and the y-axis mover, and the y-axis movement mechanism is disposed in the cover frame and rotatable around an axis of the cylindrical tooth rod.

13. The tiling display device of claim 8, further comprising:

an alignment mark disposed at a boundary between the panel seating portions of the frame.

14. A method of manufacturing a tiling display using the display panel alignment device of claim 1, the method comprising:

mounting a display panel on the panel movement controller disposed in each of the panel seating portions of the frame;

aligning the display panel by adjusting the panel movement controller;

fixing a position of the aligned display panel;

mounting a separate frame on the aligned display panel; and transferring the aligned display panel onto the separate frame by inverting the separate frame and the display panel alignment device together.

15. The manufacturing method of claim 14, wherein the fixing of the position of the aligned display panel includes applying an adhesive resin or a double-sided tape to an outer periphery of the aligned display panel.

\* \* \* \* \*